UNITED STATES PATENT OFFICE.

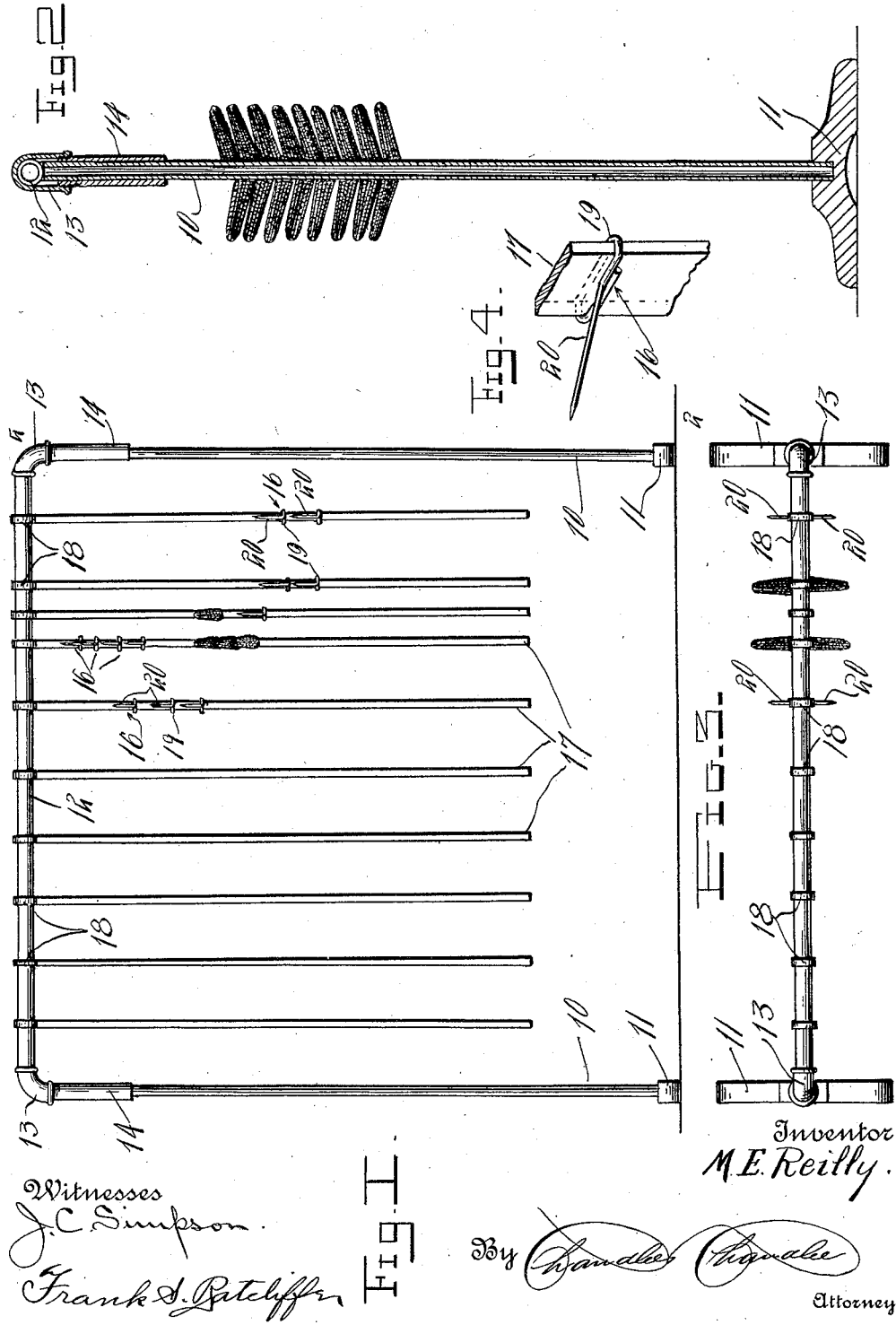

MICHAEL E. REILLY, OF NEW HAMPTON, IOWA.

SEED-RACK.

1,079,513.　　　　　Specification of Letters Patent.　　Patented Nov. 25, 1913.

Application filed May 14, 1913. Serial No. 767,636.

*To all whom it may concern:*

Be it known that I, MICHAEL E. REILLY, a citizen of the United States, residing at New Hampton, in the county of Chickasaw, State of Iowa, have invented certain new and useful Improvements in Seed-Racks; and I do hereby declare the following to be a full, clear, and exact description of the invention, such as will enable others skilled in the art to which it appertains to make and use the same.

This invention relates to improvements in devices for supporting ears of seed-corn for the purpose of drying and preserving the same.

The object resides in the provision of a compact seed corn rack, the parts of which can be readily disassembled so that the device occupies comparatively little space when packed for shipping and storage.

Another object resides in the provision of proper means for holding seed corn whereby the corn is held safely from the attack of rats and other similar vermin.

A third object of the invention is to improve the general efficiency and simplify the structure of devices of this character.

These and other objects will be apparent from the following description when taken in connection with the accompanying drawings, in which:

Figure 1 is a front elevation of a preferred form of the invention showing ears of corn positioned thereon, Fig. 2 is a vertical sectional view through one end portion of the device. Fig. 3 is a top plan view of the rack, and Fig. 4 is a perspective view of one of the ear holding members.

Referring more particularly to the drawings, my device is shown as comprising a stand including a pair of spaced uprights 10 having their lower extremities seated in sockets formed in a pair of foot pieces 11. A transverse supporting bar 12 is provided having threaded engagement at each end thereof with one arm of an elbow 13. Extending from the other arm of each elbow is a cylindrical portion 14 which fits over the upper ends of the standards 10. It will thus be seen that a stand is provided which can be readily disassembled without recourse to the use of any tools.

For supporting a plurality of ear holding members 16 there is provided a plurality of depending rods 17, oblong in cross-section and provided at their upper ends with hooks 18 by means of which they are adjustably suspended from the transverse bar 12. These bars are shorter than the standards 10 so that they are spaced from the ground in order to prevent rats and other vermin from attacking the corn.

Each of the ear holding members 16 is preferably formed from a single length of wire having one end bent in an elliptical loop 19 so as to slide on the rods 17. The other end of the member terminates in an upwardly directed spur 20 whereby said end may be inserted in the pithy portion of an ear of corn.

As before stated, the loops 19 of the ear holding members are adapted to slide on the rods 17. When an ear of corn is carried by the free end of the member, the weight of said ear will rock the loop and cause it to bind against the rod, thus preventing the ear holding member from sliding downwardly under the influence of gravity.

It will be seen that by the above structure, there is not only provided a compact knock-down rack, but there is also provided means whereby the ear holding members and the rods on which said ears are mounted are fully adjustable.

While various members of this device are shown in the drawings as being constructed of pipe sections, it will be understood that the device is not limited to this construction and that other modifications within the scope of the appended claims may be indulged in without departing from the spirit of the invention.

What is claimed is:

1. A device of the character described comprising a supporting bar, a plurality of rods depending therefrom and slidable thereon and a plurality of holding members carried by the rods and adjustable thereon.

2. A seed corn ear supporting rack comprising a pair of standards, a transverse bar detachably supported by said standards, a plurality of rods slidably and detachably depending from the bar and ear holding members slidable on the rods.

3. A seed corn ear supporting rack comprising a pair of standards, a transverse bar detachably supported by said standards, a plurality of rods slidably and detachably depending from the bar and ear holding members and said members each comprising a loop slidable on the rod and an ear engaging portion carried by the loop, said loop being adapted to bind against movement on the rod upon an ear being affixed on said ear engaging portion.

In testimony whereof, I affix my signature, in the presence of two witnesses.

MICHAEL E. REILLY.

Witnesses:
F. A. O'CONNOR,
HULDA BLATTI.

Copies of this patent may be obtained for five cents each, by addressing the "Commissioner of Patents, Washington, D. C."